May 14, 1946.　　L. S. HOBBS ET AL　　2,400,307
VARIABLE SPEED DRIVE
Filed June 26, 1943　　3 Sheets-Sheet 2
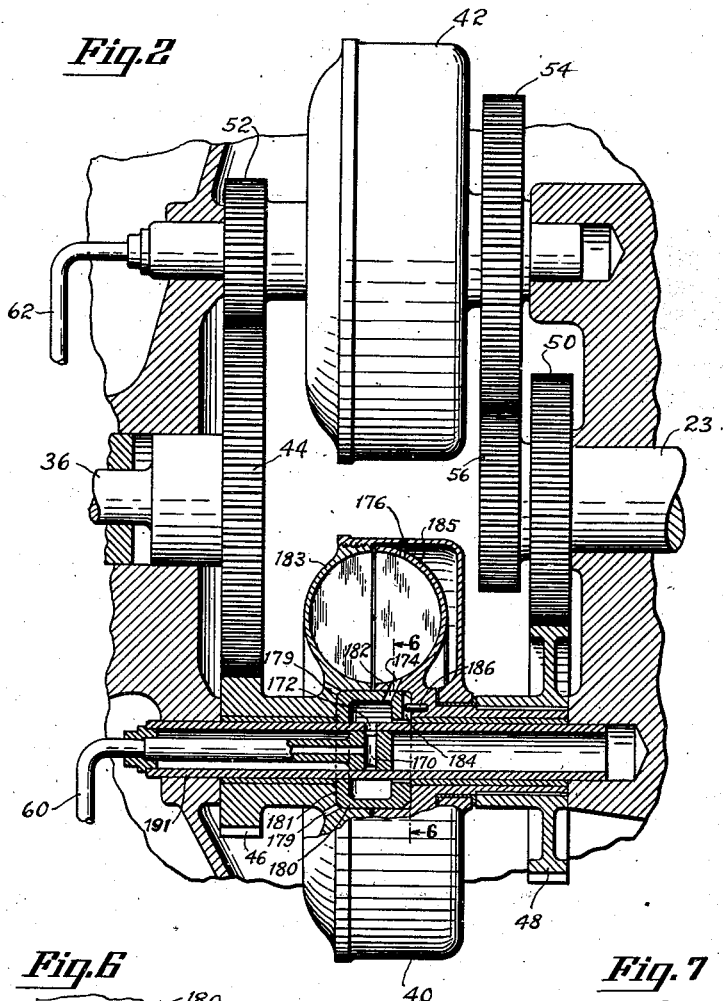
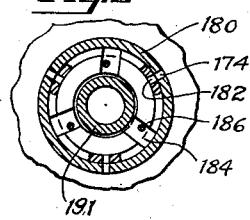
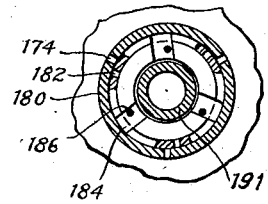
INVENTORS
Leonard S. Hobbs
Andrew V. D. Willgoos
BY
Charles L. Shelton
ATTORNEY May 14, 1946.  L. S. HOBBS ET AL  2,400,307
VARIABLE SPEED DRIVE
Filed June 26, 1943  3 Sheets-Sheet 3
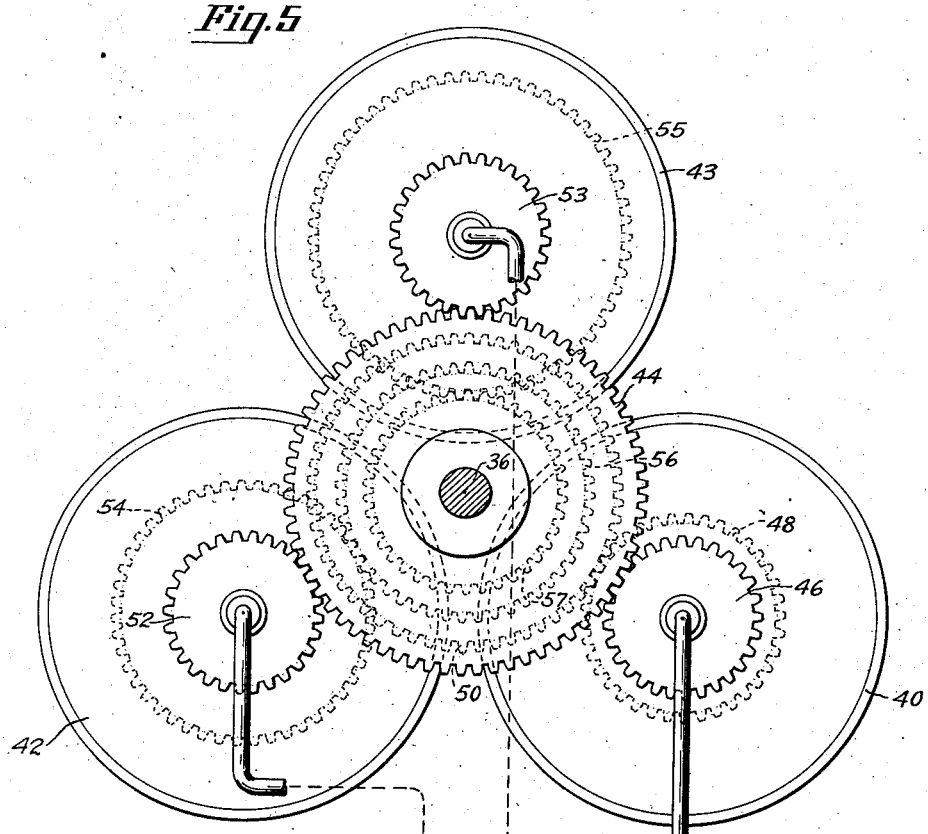
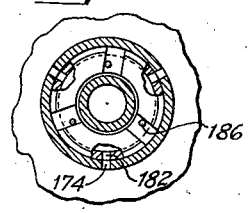
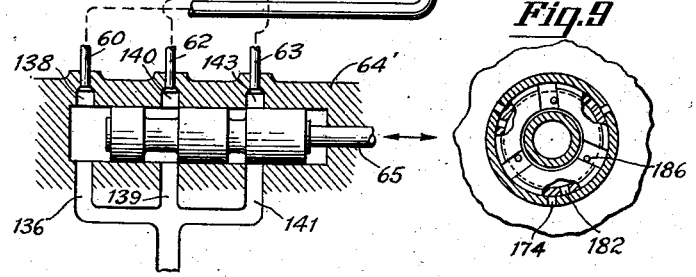
INVENTOR
Leonard S. Hobbs
Andrew V. D. Willgoos
BY
Charles L. Shelton
ATTORNEY.

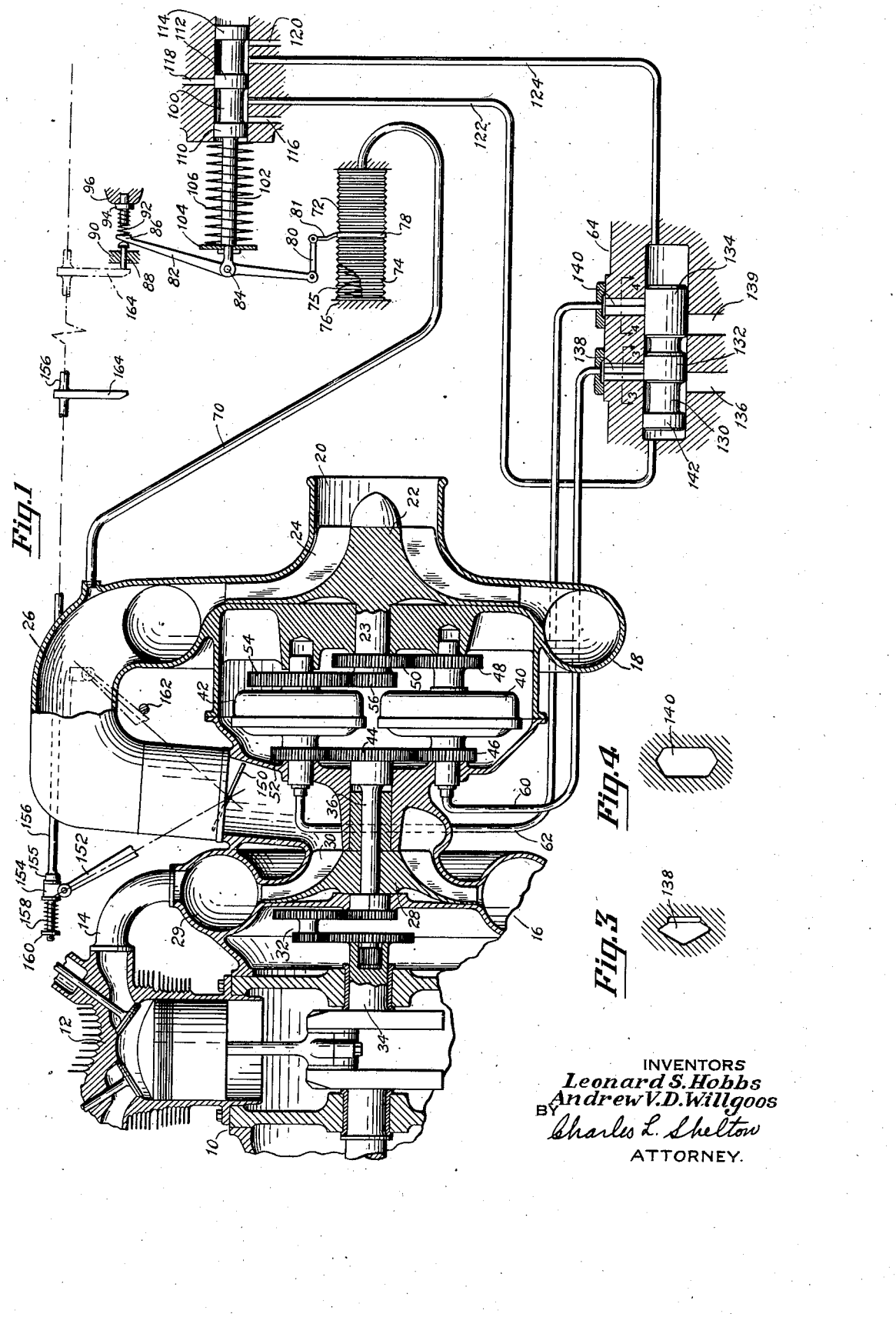

Patented May 14, 1946

2,400,307

UNITED STATES PATENT OFFICE 2,400,307

VARIABLE-SPEED DRIVE

Leonard S. Hobbs and Andrew V. D. Willgoos, West Hartford, Conn., assignors to United Aircraft Corporation, East Hartford, Conn., a corporation of Delaware Application June 26, 1943, Serial No. 492,423

18 Claims. (Cl. 123—119)

This invention relates to an improved variable speed drive, particularly adapted for driving an internal combustion engine blower, such as a supercharger or an engine cooling fan.

Reference is made to the co-pending application, Serial No. 492,422, filed June 26, 1943, concurrently herewith, by Leonard S. Hobbs, assigned to the applicants' assignee, which relates to an invention of which the present invention is a modification or improvement.

An object of this invention is to provide an improved hydraulic transmission having a variable speed ratio in which the efficiency of the drive will be high throughout the range of transmission speed ratios.

Other objects and advantages will be apparent from the specification and claims, and from the accompanying drawings which illustrate what is now considered to be a preferred embodiment of the invention.

In the drawings,

Fig. 1 is a schematic view of an internal combustion engine provided with a two-stage supercharger, one stage of which is driven by the variable speed drive of this invention.

Fig. 2 is a detail view, partly in section, of the variable speed drive of Fig. 1.

Fig. 3 is a sectional view of the valve port 138 of Fig. 1.

Fig. 4 is a sectional view of the valve port 140 of Fig. 1.

Fig. 5 is a diagrammatic view of a three speed ratio transmission, showing in section a modification of the valve of Fig. 1 as adapted for use with a three-speed drive.

Fig. 6 is a view along the line 6—6 of Fig. 2.

Fig. 7 is a view similar to Fig. 6 but showing the ring valve in closed position.

Figs. 8 and 9 are sectional views showing the ring valves of the two lower speed ratio couplings of Fig. 5.

In the embodiment shown in the drawings, an engine 10 having a cylinder 12 is supplied with intake air through induction pipes, one of which is shown at 14. A supercharger comprising main blower stage 16 and auxiliary blower stage 18 takes air from inlet 20 and initially compresses it by rapid rotation of impeller vanes 24. The air then passes through conduit 26 to vanes 30 of impeller 28 which further compress and discharge the air into a collector ring 29 connected with the engine induction pipes. While a two-stage supercharger is shown, it will be obvious that a greater or lesser number of stages or blowers may be provided, with my improved drive applied to any or all of said stages.

The first stage of the supercharger is driven through a speed increasing gear train 32 by engine crankshaft 34. The second stage is driven by shaft 36 connected with the first stage and driving the second stage impeller through a low speed range by a low speed gear train including a fluid coupling 40 and through a high speed range by a high speed gear train including a fluid coupling 42. While the drawings show only one coupling in each gear ratio, it will be understood by those skilled in the art that additional couplings may be arranged in parallel in any one gear ratio if necessary to transmit the required torque. Additional gear ratios may also be provided if desired, to give additional ranges of blower speeds.

The driving members or impellers of couplings 40 and 42 are each driven by gear 44 on shaft 36 and the meshing gears 46 and 52, respectively, while the driven member or runner of coupling 40 is connected through a low speed gear drive 48, 50 to the impeller 22 and the driven member or runner of coupling 42 is connected to the impeller 22 through a high speed gear drive 54, 56.

Couplings or clutches 40 and 42 are of the type wherein the slip between the driving and driven members thereof is dependent upon the amount of fluid present in the working chamber and the efficiency of the coupling is a function of the slip, becoming higher as the amount of slip becomes lower. These couplings are provided with restricted exit holes or drains 176 (Fig. 2) and the total amount of working fluid present at any one time in the coupling, and consequently the slip of the coupling and the speed of the impeller driven thereby, is altered by varying the amount of fluid supplied in relation to the flow capacity of the drains. For supplying fluid to the couplings, lines 60 and 62 respectively connect the low-speed coupling 40 and the high-speed coupling 42 with a valve 64, which may be operated manually or automatically to admit the working fluid, such as engine oil, to the couplings from a source or sources 136, 139 or oil under pressure.

Valve 64 is shown as automatically controlled by the outlet pressure of the auxiliary blower in such manner as to maintain the blower outlet pressure substantially constant. Fluid under pressure from the conduit 26 is applied to a flexible bellows 72 through a conduit 70. Bellows 72 works against an evacuated companion bellows 74 which is fixed at 76 and contains spring 75. A common head member 78 is positioned between bellows 72 and 74 and will be moved in one or the other direction by variations in the fluid pressure applied to bellows 72 through conduit 70. An increase in the said pressure will move lever 82 in a clockwise direction about a fulcrum 86 by means of a link 80 pivoted at one end to the lever and at the other end to arm 81 attached to the head 78; and a decrease in the blower outlet pressure will enable the spring 75 in the evacuated bellows 74 to move head 78 to the right, resulting in a counterclockwise movement of the lever. Movements of lever 82 are transmitted to control valve 100 connected thereto by stem 102 and pivot 84. Spring 106, working between the valve body and a disc 104 fixed to the stem, biases valve 100 in one direction and cooperates with spring 75 to hold valve 100 in a central or closed position at full throttle and for a given position of fulcrum 86 when the pressure in bellows 72 is at a predetermined value.

Valve 100 upon movement thereof in one or the other direction in response to an increase or decrease in the pressure in conduit 26 admits a fluid under pressure (such as engine lubricating oil) from source 118 to one or the other side of plunger 130 of valve 64 through conduits 122 and 124. When fluid from source 118 is being applied to one side of plunger 130 through one of the conduits 122, 124, then the other side of the plunger will be drained through the other of conduits 122, 124 and one of the drain ports 116, 120. These drain ports may be made restricted, if desired.

Lands or seats 110, 112, 114 of valve 100 cooperate respectively with parts 116, 118 and 120 to admit pressure from source 118 to one or the other of lines 122, 124, depending upon the direction of movement of the valve, and also to close one or the other of drains 116 and 120. Thus, valve 100 operates to move valve plunger 130 of valve 64 by changing the relative pressures in conduits 122, 124. As valve plunger 130 is shifted to the right, port 138 leading to the low speed coupling will be first placed in communication with the supply port 136 and then, upon a further movement of plunger 130, the port 140 leading to the high speed coupling will be placed in communication with supply port 139. As is shown in Figs. 3 and 4, the ports 138, 140 may be shaped to provide a desired rate of oil flow to the respective couplings at each position of the valve plunger 130.

For manual operation of the engine, throttle 150 is provided. This throttle is manually opened or closed to regulate the pressure in intake pipes 14, and consequently engine power, by an arm 152 pivotally connected to a bushing 154 slidable on throttle rod 156. Bushing 154 and throttle rod 156 are ordinarily held against relative movement by a flange or stop 155 fixed to the rod and against which the bushing is held by spring 158 acting between the bushing and a disc 160 fixed to the throttle rod. After the throttle is opened to its full extent, arm 152 contacts a stop 162 and additional force exerted on the throttle rod 156 will compress spring 158 and allow a further movement of rod 156 beyond the fully opened throttle position. An arm 164 is so positioned on rod 156 as to engage pin 88, slidably mounted in a fixed support 90, simultaneously with the engagement of throttle arm 152 and stop 162. The additional movement of rod 156 beyond full throttle position, as permitted by compression of spring 158, causes arm 164 to move pin 88 and the fulcrum end 86 of lever 82 to the right against the action of spring 92 positioned between the end of the lever and a lever stop and spring guide pin 94 attached to a fixed support 96.

The position of fulcrum 86 may be so selected that for part throttle conditions, when arm 164 is separated from pin 88 and fulcrum 86 is held in the extreme lefthand position by spring 92, the spring 106 will maintain valve 100 in a lefthand position in which it admits oil to line 124 and thus causes valve 64 to close both coupling supply ports 138, 140. A slight shift of fulcrum 86 to the right, by movement of rod 156 beyond full throttle position, will shift valve 100 and bias springs 106, 75 to an operative position in which the valve 100 will be operated in response to variations in fluid pressure in conduit 26 and bellows 72 and will control valve plunger 130 to regulate said pressure to a predetermined value. Further movement of fulcrum 86 to the right, as caused by further movement of rod 156 and permitted by compression of spring 92, will reset or adjust the control device so as to regulate the pressure in conduit 26 to higher values up to a maximum determined by the stop pin 94.

When valve 64 is opened, by either automatic or manual operation of valve 100, working fluid is first admitted from the supply port 136 to the low speed coupling 40 and upon a further movement of plunger 130 is admitted from supply port 139 to the high speed coupling 42. The working fluid is preferably engine lubricating oil delivered under pressure to ports 136, 139 by a pump supplied from an oil sump or reservoir. The oil passes from port 136 through the valve and conduit 60 to the low speed coupling by way of ports 170, 172, and 174 (Fig. 2) and is drained from the coupling back to the oil sump through the drain hole 176 (Fig. 2). If the low speed coupling, operating at its minimum slip, does not drive the blower at a speed sufficient to maintain the required engine charging pressure, then valve 100 will be operated by the bellows to move valve plunger 130 further to the right and the land 134 will uncover high speed valve port 140. Lands 132, 134 of valve 64 are positioned to admit oil only to the low speed coupling over an initial range of movement of plunger 130, to the right. Upon movement of plunger 130 beyond this range, as would be occasioned by an engine or requirement beyond that which could be supplied at the proper pressure by the low speed gear-ratio at minimum coupling slip, port 140 will also be uncovered and valve 64 will supply oil to both conduits 60 and 62, and the high-speed coupling 42 will gradually pick up the load and drive the blower impeller through the high gear-ratio as the port 140 is gradually opened by valve 64.

When the drive is in the high speed ratio through the coupling 42, some provision must be made to empty the low speed coupling of oil. Otherwise, a power loss would be occasioned by the fact that the high speed coupling, when driving the blower impeller, also drives the runner of the low speed coupling through the gears 48 and 50. In other words, the driving and driven members of both couplings are always respectively interconnected by the gears 44, 46, 52 and the gears 54, 56, 50, 48 and if some provision were not made to empty one coupling when the other coupling was driving, then there would always be a loss of power through turbulence created in the fluid in the non-driving coupling. Further, such an attempt to drive the impeller through different speed ratios would probably result in the imposition of destructive loads on the transmission.

Fig. 2 shows a very effective arrangement for cutting off the supply of oil to the low speed coupling as the high speed coupling takes over the load. A bushing or ring valve 180 encircles the shaft 191 upon which the driving element 183 and the driven element 185 of the coupling revolve. This ring valve has a frictional running fit 181 with the driving element 183 and has a free fit and a lost-motion pin and a slot connection 186, 184 with the driven element 185. When the low speed coupling is driving the blower, the runner 185 of the coupling will always be turning slower than the impeller 183 and valve 180 will be held by the runner with the pin 186 against one side of the slot 184 (depending upon the direction of rotation of the coupling) as is shown in Fig. 6. Thus, the ring valve will be positively connected to runner 185 through pin 186 but will tend to turn with impeller 183 because of the frictional fit between the mating surfaces 181 of the valve and the coupling impeller. The tendency of the ring valve 180 to turn with the driver 183 of the coupling is greatly increased by the provision of drain ports 179, which relieve the oil pressure on one side of the ring and enable the oil pressure within the ring to force the ring hard against the driver 183, creating considerable friction for movement of the ring with the driver. Thus, the ring valve 180 is forced by oil pressure, as in the manner of a piston, into frictional engagement with driver 183. When impeller 183 is turning faster than runner 185, a port 182 in the valve matches with the port 174 in the runner and the oil supply is passed to the coupling through these ports and out through the drain 176. Upon an assumption of the blower load by the high speed coupling 42, the runner 185 of the low speed coupling will be turned faster than the impeller 183 by gears 50, 48 when the blower shaft 23 has begun to be rotated by the high speed coupling 42 rather than by the low speed coupling 40. As runner 185 begins rotating faster than impeller 183, pin 186 will ride over against the other side of slot 184, to the position shown in Fig. 7. Friction between ring valve 180 and the impeller 183 tends to turn these two members together but the ring valve is positively driven with runner 185 through the pin and slot connection. Thus, the ring valve will assume either the open position of Fig. 6 or the closed position of Fig. 7 in accordance with predetermined changes in the relative speed of the impeller and runner members, depending (in the embodiment of the drawings) on whether or not the impeller 183 of the low speed coupling is rotating faster or slower than the runner 185 thereof. When the coupling 42 begins to drive blower shaft 23, the runner 185 will be rotated faster than the impeller 183 and the valve will be turned relative to the runner 185 a distance equal to the width of slot 184 less the diameter of pin 186. This movement is made sufficient (Fig. 7) to mask the port 174 in the runner and cut off the flow of oil through ports 182, 174 to the coupling. Drain 176 is always open, so when the oil supply is cut off by the ring valve, the coupling 40 will empty and enable the impeller and runner members thereof to be relatively rotated by gears 44 and 50 without absorbing any material amount of power. When the drive is in the high ratio and the slip of coupling 42 increases beyond a predetermined value, as would be caused by a stoppage or a sufficiently large reduction in the supply of oil admitted to the coupling, then runner 185 will be rotated slower than impeller 183 and valve 180 will be returned to the open position in which it supplies oil to coupling 40. The oil supply to coupling 42 may be admitted through a hollow countershaft in a manner similar to the mode of oil admission shown in the drawings for coupling 40, but with the ring valve 180 omitted.

In operation, if the pressure in conduit 26 drops below a predetermined value, which value may be adjusted or modified by moving rod 156 to shift the position of fulcrum 86, valve 100 will be moved to the right by the action of spring 75 in bellows 74. Oil under pressure from source 118 will then create a pressure difference across valve 64 and shift plunger 130 to the right to increase the oil supply to the fluid coupling which is engaged. As the size of the drain orifice (or orifices) 176 is fixed an increase in the amount of oil supplied to the coupling will increase the amount of fluid maintained therein, and will decrease the slip of the coupling and consequently increase the speed of blower impeller 22. If the resultant increase in the speed of the blower is not sufficient to maintain the pressure in manifold 26 at the desired value, a further operation of valve 100 will further open valve 64 to admit an increased quantity of oil to the transmission; conversely, if the manifold pressure increases beyond the predetermined value, the quantity of oil admitted to the transmission will be decreased, until the amount of oil in the driving coupling is maintained just sufficient to hold the engine charging pressure at the desired value. Thus the blower speed will be varied in response to changes in pressure on the outlet side of the blower and the transmission will automatically shift the blower drive from one gear ratio to another depending upon the gear ratio required to turn the blower impeller at the speed called for by the control apparatus.

When the coupling 40 reaches its maximum capacity, or minimum slip, then a "call" by the bellows 72 for a higher blower speed will operate valve 64 to open the inlet 139 to line 62 and high speed coupling 42. This admission of oil to the high speed coupling will bring the driven element or runner thereof gradually up to a speed at which it tends to rotate the shaft 23 at the same speed at which the said shaft is rotated by the low speed coupling 40. A further slight increase in the speed of shaft 23 by high speed coupling 42 will reverse the direction of power transmission between coupling 40 and the gear 50 on shaft 23 so that coupling 42 and gear 50 will rotate the runner 185 of coupling 40 faster than the impeller 183 thereof and operate ring valve 180 to cut off the supply of oil to the low speed coupling, and thus in effect remove it from the drive. In this position, when the drive is in the high gear ratio, the low speed coupling merely floats on the line and absorbs little if any power. Conversely, a "call" by the control apparatus for lower engine charging pressure will operate valve 64 to gradually close first the high speed port 140 and then the low speed port 138. When the slip of the high speed coupling increases to a value at which the runner 185 rotates slower than impeller 183, then valve 180 will be snapped to open position in which oil is admitted to coupling 40, which will then become engaged and will "takeover" the blower drive as the port 140 is closed and coupling 42 empties through its drain ports, which may be similar to those shown at 176.

In each gear ratio the speed of the blower may be infinitely varied by varying the amount of oil admitted to either coupling, valve 64 acting to open the ports 138 and 140 only to that degree necessary to drive the blower at a speed sufficiently high to maintain the desired engine charging pressure. Thus, a very large number of speed ratios are provided. Furthermore, the drive may be made highly efficient at any one of the said ratios because each of the couplings need be operated only over a low range of slip speeds. In other words, the total variation in speed ratio is distributed among two couplings (in the embodiment shown in Figs. 1 and 2 of the drawings) so that each need operate only over the high efficiency portion of its slip speed range.

Fig. 5 shows a modification providing three transmission speed ranges or gear ratios. In this modification, as valve 64' is shifted to the right, a low speed coupling 40 and gear ratio 44, 46, 48, 50 is engaged by oil fed through line 60, then an intermediate speed coupling 42 and gear ratio 44, 52, 54, 56 is engaged by oil admitted to line 62, and finally a high ratio coupling 43 and gear ratio 44, 53, 55, 57 is engaged by oil fed through port 143 and line 63. The two lower speed couplings are provided with ring valves as shown in Figures 8 and 9. Hence, as each successive gear ratio is engaged by valve 64', the lower ratios will be disengaged by the ring valves, and as each successive ratio is disengaged by the valve 64' (as it moves in a reverse direction, to the left) the ring valves will operate to engage the coupling in the next lower ratio. In the modification of Fig. 5 a stem 65 is provided for operating the valve, either automatically or manually. Valve 64' may also be operated hydraulically, in the manner disclosed in connection with Fig. 1.

It is to be understood that the invention is not limited to the specific embodiment herein illustrated and described, but may be used in other ways without departure from its spirit as defined by the following claims.

We claim:

1. In combination, an internal combustion aircraft engine, a charging blower therefor, a lower ratio gear train including a first fluid coupling for driving said blower by said engine over a first speed range relative to the speed of said engine, a higher ratio gear train including a second fluid coupling for driving said blower by said engine over a second speed range relative to the speed of said engine, means including an adjustable flow controlling means for admitting a working fluid first to one of said couplings and then to both of said couplings, fluid pressure responsive means for adjusting said flow controlling means in response to changes in the discharge pressure of said blower, and automatically operative valve means connected in series with said flow controlling means and one of said couplings for cutting off the supply of working fluid to said one coupling when the other of said couplings is driving said blower.

2. In an aircraft engine, an engine driven shaft, a multiple speed ratio transmission operatively connected with said engine driven shaft, a first variable slip coupling in one of said transmission ratios, a second variable slip coupling in another of said transmission ratios, means for selectively engaging one or both of said couplings, one of said couplings including a driving member and a driven member, and means positively connected with one of said members and frictionally connected with another of said members for rendering one of said couplings ineffective when another of said couplings is driving.

3. In a variable speed transmission, a driving shaft, a driven shaft, a lower ratio gear train operatively connecting said driving shaft and said driven shaft, a higher ratio gear train operatively connecting said driving shaft and said driven shaft, a variable slip fluid coupling in each said gear train, each said coupling including a driving member and a driven member, said driving members and said driven members being respectively interconnected by gears of said gear train, means to admit a working fluid to each of said couplings, and a valve having a lost-motion connection with the driven member of one of said couplings and effective upon rotation of said driven member faster than its driving member to prevent admission of said working fluid to said one coupling.

4. In an automatic change speed transmission, a driven shaft, a driving shaft, a higher speed ratio transmission mechanism operatively connecting said driving and driven shafts, at least one lower speed ratio transmission mechanism operatively connecting said driven and driving shafts, a variable slip fluid coupling in each of said transmission mechanisms, means for connecting each of said couplings, in sequence, with a working fluid supply means, a valve for controlling the flow of said working fluid to said lower speed ratio coupling, and means operatively connecting said valve with both the driving and the driven sides of its respective coupling for shifting said valve in accordance with the relative speeds of the driving and driven sides of said coupling.

5. A fluid coupling comprising, a driving member, a driven member, means forming a fluid chamber for retaining a working fluid to torsionally connect said driving and driven members, means for admitting a working fluid to said chamber, and a valve element positively connected with limited relative movement to one of said members and frictionally connected to the other of said members and having a valve port therein for controlling the admission of said fluid to said coupling.

6. A fluid coupling comprising, a driving member, a driven member, means forming a fluid chamber for retaining a working fluid to torsionally connect said driving and driven members, means for admitting a working fluid to said chamber, and a valve for controlling the admission of said fluid to said chamber, said valve comprising an element frictionally engaged with one of said members and positively connected with relative rotary lost motion by a pin and slot connection to the other of said members, said element having a fluid passage therein.

7. A fluid coupling comprising, a hollow shaft, a driven element rotatable on said shaft, a driving element rotatable on said shaft, means forming a working fluid chamber between said elements, inlet means for admitting a working fluid from said hollow shaft to said chamber, continuously open outlet means for draining said fluid from said chamber, said outlet means being of less flow capacity than said inlet means, a rotatable valve for controlling the admission of said fluid to said chamber through said inlet means, said valve being positively secured with limited relative movement to said driven element, and impositive means tending to cause said valve to rotate with said driving element.

8. In combination, an aircraft engine, a blower, a lower ratio gear train including a first fluid coupling for driving said blower by said engine over a first speed range relative to the speed of said engine, a higher ratio gear train including a second fluid coupling for driving said blower by said engine over a second speed range relative to the speed of said engine, means for admitting a working fluid to each of said couplings, and means sensitive to a reversal in the direction of power transmission through one of said gear trains for disengaging said one gear train.

9. In combination, an aircraft engine, a blower, a lower ratio gear train including a first fluid coupling having driving and driven elements for driving said blower by said engine over a first speed range relative to the speed of said engine, a higher ratio gear train including a second fluid coupling having driving and driven elements for driving said blower by said engine over a second speed range relative to the speed of said engine, adjustable flow controlling means for admitting a working fluid first to one of said couplings and then to both of said couplings, and means responsive to a reversal in the relative speed of the driving and driven elements of at least one of said couplings for engaging and disengaging said coupling.

10. In a fluid coupling having an impeller member and a runner member, said members cooperating to form a working fluid chamber, means for varying the quantity of working fluid retained in said chamber comprising a member having a valve port therein, said member being rotatable with one of said coupling members, and means for moving said member relative to said one coupling member during rotation thereof in response to a predetermined change in the relative speed of said impeller and runner members.

11. In a fluid coupling, an impeller member, a runner member, an annular recess in said impeller member, an annular recess in said runner member, an annular member having portions thereof disposed respectively in each of said recesses, cooperating valve ports in one of said coupling members and said annular member, and a lost-motion connection providing limited relative movement between said ported coupling member and said annular member.

12. The combination of claim 11, in which said annular member has a transverse wall bearing against a wall of one of said recesses, and a pressure relief drain port open to the meeting faces of said walls.

13. The combination of claim 8, in which the means for disengaging said one gear train includes valve means carried by the coupling in said one gear train for controlling the admission of working fluid to said coupling.

14. In combination, an aircraft engine, a blower, a lower ratio gear train including a first fluid coupling for driving said blower by said engine over a first speed range relative to the speed of said engine, a higher ratio gear train including a second fluid coupling for driving said blower by said engine over a second speed range relative to the speed of said engine, means for admitting a working fluid either to a selected one of said couplings or to both of said couplings, and means including a valve sensitive to a reversal in the direction of power transmission through said selected coupling for disengaging said selected coupling.

15. In combination, an aircraft engine, a blower, a lower ratio gear train including a first fluid coupling for driving said blower by said engine, a higher ratio gear train including a second fluid coupling for driving said blower by said engine, means for admitting a working fluid to each of said couplings, means for controlling the slip of at least one of said couplings, and means sensitive to a reversal in the direction of power transmission through one of said gear trains for disengaging said one gear train.

16. The combination of claim 15, in which the means for disengaging said one gear train includes a valve for preventing the admission of working fluid to one of said couplings under predetermined conditions.

17. In combination, an aircraft engine, a blower, a low ratio gear train including a first fluid coupling for driving said blower by said engine, an intermediate ratio gear train including a second fluid coupling for driving said blower by said engine, a high ratio gear train including a third fluid coupling for driving said blower by said engine, means for admitting a working fluid to each of said couplings, means for controlling the slip of at least one of said couplings, and means sensitive to a reversal in the direction of power transmission through said low gear train and through said intermediate gear train for disengaging said gear trains, respectively.

18. In a fluid coupling having an impeller member and a runner member, said members cooperating to form a working fluid chamber, a fluid passage for admitting working fluid to said chamber, a fluid passage for draining said fluid from said chamber, means for disengaging said coupling by causing said chamber to empty comprising a valve member for controlling the flow through one of said fluid passages, said valve being rotatable with one of said coupling members, and means for moving said valve relative to said one coupling member during rotation thereof in response to a predetermined change in the relative speed of said impeller and runner members.

LEONARD S. HOBBS.
ANDREW V. D. WILLGOOS.